UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF ARTIFICIAL STONE.

SPECIFICATION forming part of Letters Patent No. 486,448, dated November 22, 1892.

Application filed December 15, 1891. Serial No. 415,183. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Artificial Stone, (Case No. 3,) of which the following is a full, clear, concise, and exact description.

My invention relates to the process and composition of matter used in the production of cement or artificial stone; and its object is to produce a stone or cement which has magnesium as a base, but which possesses the quality heretofore wanting in magnesium artificial stones of being proof against the attack of atmospheric and climatic influences.

In other applications I have described a process and composition of matter by which artificial stone is protected against atmospheric and climatic influences by the addition of acid albumen. In this invention which I am at present describing I secure the same result by a different process and with a different composition of matter. In this process I take oleic acid, or any oil which can be saponified, and pour six ounces of the same in a cold strong solution of caustic soda commonly called "soda-lye" and water. I stir the same continually until the oil is thoroughly saponified, after which it is allowed to stand when the saponified oil rises to the surface, from which I remove it and throw it into a vessel containing a concentrated solution of magnesium sulphate. This mixture upon being agitated will produce a precipitate in from two to three minutes, and this precipitate is an insoluble metallic-magnesium soap. I take the precipitate and add it to fifty pounds magnesium oxide and three gallons of magnesium-chloride solution of at least 25° Baumé. This material, when thoroughly mixed, becomes the binding material, to which may be added sand or any other inert material in the proportion of from one to twenty times the amount of inert substance that there is of binding material. The insoluble metallic-magnesium soap thoroughly and intimately permeates every part of the resulting product and operates to protect the cement from the influences of moisture and carbonic-acid gas. The proportions of the various ingredients may be varied without serious detrimental results. Instead of first producing the metallic-magnesium soap the same result may be obtained by mixing the saponified oil intimately with a mass of magnesium sulphate, magnesium chloride, and magnesium oxide, prepared in the manner above described.

The mass, after the above operation, is in a plastic state and can be made more plastic even to the point of fluidity, if desired, and can be cast into molds of any desired form, or used like plaster on walls or other surfaces.

The inert material which gives the best results is sand, quartz, or other non-absorbent material; but more porous substances—such as sawdust or wood pulp—can be used, in which case a greater quantity of magnesium-chloride solution is desirable, as a portion of that solution becomes absorbed in the porous substances, and thereby is prevented from entering into combination with the magnesium oxide or the metallic-magnesium soap.

The intimate mechanical mixture of the metallic-magnesium soap produced as above described results in thoroughly enveloping and sealing the artificial stone, which results from the process and composition of matter, which I have described, with an insoluble envelope, which is itself not attacked by carbonic-acid gas in the atmosphere, and prevents the same from attacking the other materials of the composition.

Having thus described my invention, what I claim as new, and desire to secure by Letters Patent, is—

1. The process of making cement, which consists of mixing saponified oil with a concentrated solution of magnesium sulphate, whereby a metallic-magnesium soap is produced, adding said metallic-magnesium soap to a mixture of magnesium oxide and magnesium chloride in a plastic condition, and while the same is still plastic adding thereto inert material, whereby the cement is rendered impervious to moisture, substantially as described.

2. The herein-described composition of matter for the production of artificial stone, consisting of metallic-magnesium soap, magnesium oxide, magnesium chloride, and an inert substance, in substantially the proportions specified.

In witness whereof I hereunto subscribe my name this 12th day of December, A. D. 1891.

LOUIS ENRICHT.

Witnesses:
CHARLES A. BROWN,
GEORGE L. CRAGG.